US012627541B2

(12) United States Patent
Wu et al.

(10) Patent No.: US 12,627,541 B2
(45) Date of Patent: May 12, 2026

(54) MULTI-USER MULTIPLE-INPUT MULTIPLE-OUTPUT DETECTION METHOD AND APPARATUS, ELECTRONIC DEVICE, AND MEDIUM

(71) Applicant: SANECHIPS TECHNOLOGY CO., LTD., Shenzhen (CN)

(72) Inventors: Gang Wu, Shenzhen (CN); Junling Zhang, Shenzhen (CN)

(73) Assignee: SANECHIPS TECHNOLOGY CO., LTD., Shenzhen (CN)

( * ) Notice: Subject to any disclaimer, the term of this patent is extended or adjusted under 35 U.S.C. 154(b) by 298 days.

(21) Appl. No.: 18/564,068

(22) PCT Filed: Mar. 21, 2022

(86) PCT No.: PCT/CN2022/081930
§ 371 (c)(1),
(2) Date: Nov. 25, 2023

(87) PCT Pub. No.: WO2022/252760
PCT Pub. Date: Dec. 8, 2022

(65) Prior Publication Data
US 2024/0267269 A1     Aug. 8, 2024

(30) Foreign Application Priority Data

May 31, 2021     (CN) .......................... 202110606044.9

(51) Int. Cl.
*H04L 27/00*          (2006.01)
*H04B 7/0452*      (2017.01)
(52) U.S. Cl.
CPC ....... *H04L 27/0012* (2013.01); *H04B 7/0452* (2013.01)

(58) Field of Classification Search
CPC .. H04B 7/0452; H04B 7/0854; H04B 1/7105; H04B 1/1027; H04B 7/0617;
(Continued)

(56) References Cited

U.S. PATENT DOCUMENTS 8,731,028 B2     5/2014   Farmanbar et al.
8,787,483 B1     7/2014   Sun et al.
(Continued)

FOREIGN PATENT DOCUMENTS

CN          101442390 A      5/2009
CN          107342797 A      11/2017
(Continued)

OTHER PUBLICATIONS

European Patent Office, the Extended European Search Report dated Apr. 7, 2025, for corresponding EP application No. 22814808.6.
(Continued)

*Primary Examiner* — Olumide Ajibade Akonai
(74) *Attorney, Agent, or Firm* — Li & Cai Intellectual Property (USA) Office

(57) ABSTRACT

Provided are a multi-user multiple-input multiple-output detection method and apparatus, an electronic device, and a computer-readable storage medium. The method includes: in a case where it is determined that received data includes data for first user equipment and data for at least one second user equipment, determining a first detection method according to a modulation mode of the first user equipment (100); and performing multi-user joint detection on the received data with the first detection method (101).

13 Claims, 2 Drawing Sheets

(58) Field of Classification Search
CPC .. H04B 7/0417; H04B 7/0632; H04B 7/0413;
H04B 1/71057; H04B 17/336; H04B
7/0891; H04L 27/0012; H04L 25/03242;
H04L 1/0048; H04L 1/0054; H04L
2025/03426
See application file for complete search history.

(56) References Cited

U.S. PATENT DOCUMENTS

| | | | | |
|---|---|---|---|---|
| 2005/0175122 | A1* | 8/2005 | Nefedov | H04B 1/7105 375/323 |
| 2008/0019331 | A1 | 1/2008 | Thomas et al. | |
| 2008/0031309 | A1* | 2/2008 | Chang | H04L 27/2695 375/147 |
| 2011/0317542 | A1* | 12/2011 | Brown | H04L 5/0007 370/210 |
| 2013/0287150 | A1* | 10/2013 | Jung | H04L 25/03318 375/346 |
| 2015/0063503 | A1* | 3/2015 | Kosakowski | H04L 1/0054 375/341 |
| 2016/0344459 | A1 | 11/2016 | Chen | |
| 2020/0359299 | A1 | 11/2020 | Suh | |

FOREIGN PATENT DOCUMENTS

| | | | |
|---|---|---|---|
| CN | 111182629 | A | 5/2020 |
| CN | 112383330 | A | 2/2021 |
| CN | 112398512 | A | 2/2021 |
| EP | 1564906 | A2 | 8/2005 |
| JP | 2008532362 | A | 8/2008 |
| JP | 2013017114 | A | 1/2013 |
| WO | WO 2012028097 | A1 | 3/2012 |
| WO | WO 2020094370 | A1 | 5/2020 |

OTHER PUBLICATIONS

Japan Patent Office, Decision of Refusal dated May 13, 2025, for corresponding JP application No. 2023-574287.
Japan Patent Office, First Office Action dated Dec. 17, 2024, for corresponding JP application No. 2023-574287.
WIPO, International Search Report issued on May 26, 2022.
India Patent Office, the First Examination Report dated Nov. 19, 2025, for corresponding IN application No. 202317089359.
Korea Ministry of Intellectual Property, Notice of Allowance dated Nov. 11, 2025, for corresponding KR application No. 10-2023-7040862.

* cited by examiner

100

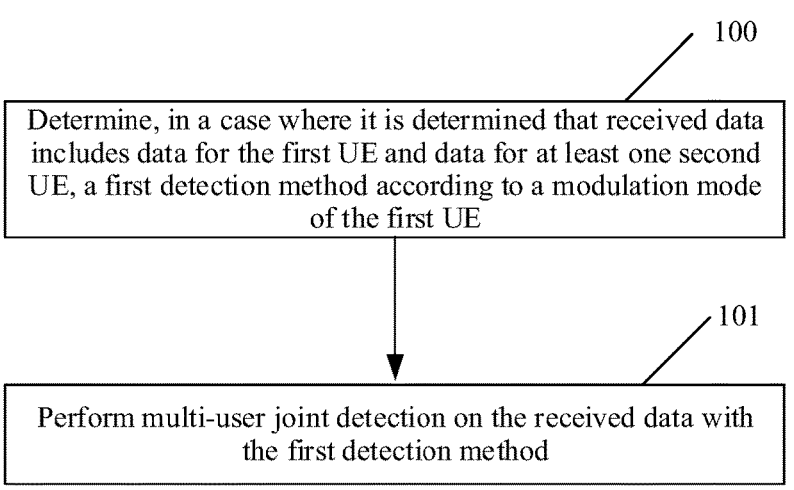

Determine, in a case where it is determined that received data includes data for the first UE and data for at least one second UE, a first detection method according to a modulation mode of the first UE

101

Perform multi-user joint detection on the received data with the first detection method

FIG. 1 point 1

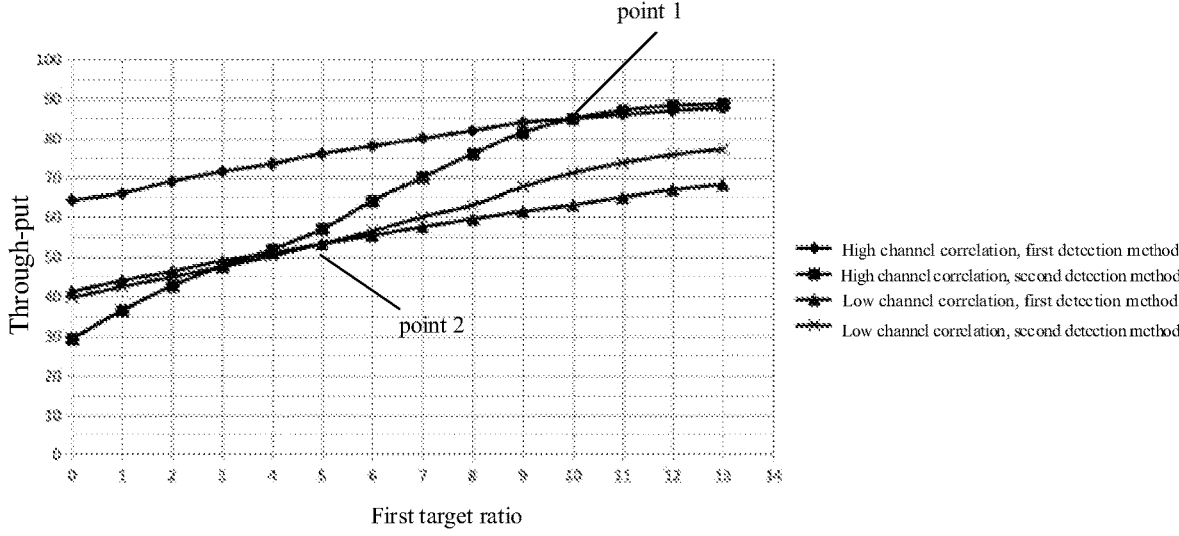

Through-put point 2

First target ratio

High channel correlation, first detection method
High channel correlation, second detection method
Low channel correlation, first detection method
Low channel correlation, second detection method

FIG. 2

MULTI-USER MULTIPLE-INPUT MULTIPLE-OUTPUT DETECTION METHOD AND APPARATUS, ELECTRONIC DEVICE, AND MEDIUM

CROSS-REFERENCE TO RELATED APPLICATIONS

The present disclosure claims the priority to Chinese Patent Application No. 202110606044.9 filed on May 31, 2021, the contents of which are incorporated herein by reference in their entirety.

TECHNICAL FIELD

The present disclosure relates to the technical field of communications, and in particular, to a multi-user multiple-input multiple-output (MIMO) detection method and apparatus, an electronic device, and a computer-readable storage medium.

BACKGROUND

The MIMO technology is one of important technologies for wireless communication systems to achieve high spectral efficiency to improve system capacity, and is also an important feature of systems of the New Radio technology (NR) of the 5th Generation Mobile Communication Technology (5G). In order to meet requirements of International Mobile Telecommunications-Advanced (IMT-Advanced) of the International Telecommunication Union (ITU) on the high spectral efficiency of the systems, in addition to adopting the single-user MIMO technology to increase the spectral efficiency, 5G NR also adopts the multi-user MIMO technology, that is, a plurality of parallel data streams are sent to different User Equipment (UE) under same time-frequency resources, or different UEs send data to a gNB using the same time-frequency resources. Since a distance between users in the multi-user MIMO technology is larger than that between antennas in the single-user MIMO technology, it is easier to realize parallel transmission of multiple data streams in the multi-user MIMO technology, so that the spectral efficiency can be further increased. Correspondingly, a multi-user MIMO detection technique of 5G NR becomes one of the important technologies that determine performance of 5G NR receivers.

Conventional MIMO detection techniques include Minimum Mean Square Error (MMSE) detection and Sphere Decoding (SD) detection. The SD detection can approach the optimal performance in terms of performance, i.e., performance of a Maximum Likelihood (ML) algorithm, while complexity of the SD detection is much lower than that of the ML algorithm. Therefore, the SD detection is often selected as a single-user MIMO detection technique. The SD detection includes two parts, i.e., QR decomposition preprocessing and search of entities, the search is to calculate metrics according to constellation-point symbols corresponding to a modulation mode of each parallel data stream and perform comparison. Complexity of the MMSE detection is much lower than that of the SD detection, and performance of the MMSE detection can be equal to that of the SD detection in certain scenes, so that there is still room for application of the MMSE detection. The MMSE detection is to perform detection with no need to acquire the modulation modes of the parallel data streams.

A modulation mode of a multi-antenna parallel data stream in a single-user MIMO scene is a modulation mode configured for a local user, and the SD detection can achieve detection on each data stream. However, in a downlink multi-user MIMO scene of 5G NR, since the local user cannot acquire modulation modes of other users, the local user cannot perform SD detection according to the modulation mode configured for each data stream as in the case of the single-user MIMO scene. According to the related technology, a processing flow of a transmitting terminal needs to be changed, that is, Block Diagonalization is adopted for precoding to eliminate interference between the users, and then an MMSE algorithm is adopted at a receiving terminal, that is, the transmitting terminal and the receiving terminal need to jointly perform processing, which is complex to implement.

SUMMARY

Embodiments of the present disclosure provide a multi-user MIMO detection method and apparatus, an electronic device, and a computer-readable storage medium.

In a first aspect, an embodiment of the present disclosure provides a multi-user MIMO detection method applicable to first user equipment, including: in a case where it is determined that received data includes data for the first user equipment and data for at least one second user equipment, determining a first detection method according to a modulation mode of the first user equipment; and performing multi-user joint detection on the received data with the first detection method.

In a second aspect, an embodiment of the present disclosure provides an electronic device, including: at least one processor; and a memory having stored thereon at least one program which, when executed by the at least one processor, implements the above multi-user MIMO detection method.

In a third aspect, an embodiment of the present disclosure provides a computer-readable storage medium having stored thereon a computer program which, when executed by a processor, implements the above multi-user MIMO detection method.

In a third aspect, an embodiment of the present disclosure provides a multiple-user MIMO detection apparatus, including: a determination module configured to determine, in a case where it is determined that received data comprises data for first user equipment and data for at least one second user equipment, a first detection method according to a modulation mode of the first user equipment; and a detection module configured to perform multi-user joint detection on the received data with the first detection method.

According to the multi-user MIMO detection method provided by the embodiments of the present disclosure, in the case where the received data includes the data for the first user equipment and the data for the at least one second user equipment, the first detection method is determined according to the modulation mode of the first user equipment, and the multi-user joint detection is performed on the received data with the first detection method. During the whole detection process, the modulation mode of the second user equipment is not needed, and the processing flow of the transmitting terminal does not need to be changed, thereby achieving detection of the received data in a simple way.

BRIEF DESCRIPTION OF DRAWINGS

FIG. 1 is a flowchart illustrating a multi-user MIMO detection method according to an embodiment of the present disclosure;

FIG. 2 is a schematic diagram of variation curves of a detected performance parameter along with a first target ratio which are corresponding to different detection methods corresponding to different channel correlations according to an embodiment of the present disclosure;

DETAIL DESCRIPTION OF EMBODIMENTS

Figure 3:
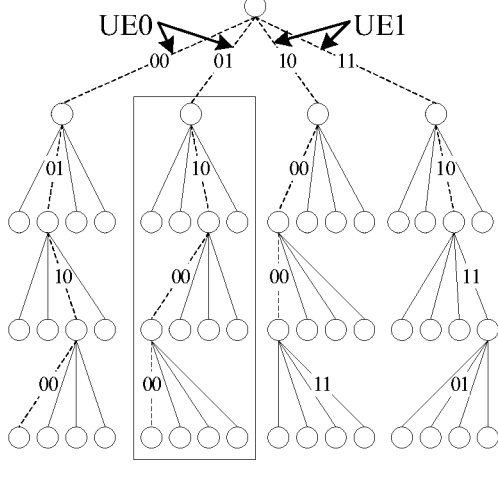
FIG. 3 is a schematic diagram of an SD path search according to an embodiment of the present disclosure.

A multi-user MIMO detection method and apparatus, an electronic device, and a medium provided herein will be described in detail below with reference to the drawings.

Exemplary embodiments of the present disclosure will be described more fully below with reference to the drawings, but the exemplary embodiments described herein may be embodied in different forms and should not be interpreted as being limited to the embodiments described herein. The embodiments are provided to make the present disclosure thorough and complete, and are intended to enable those of ordinary skill in the art to fully understand the scope of the present disclosure.

The embodiments described herein and the features therein can be combined with one another if no conflict is incurred.

The term "and/or" used herein includes any and all combinations of at least one associated listed item.

The terms used herein are merely used to describe specific embodiments, and are not intended to limit the present disclosure. As used herein, "a" and "the" which indicate a singular form are intended to include a plural form, unless expressly stated in the context. It should be further understood that the term(s) "include" and/or "be made of" used herein indicate(s) the presence of the described features, integers, operations, elements and/or components, but do not exclude the presence or addition of one or more other features, integers, operations, elements, components and/or combinations thereof. In addition, when describing a threshold herein, although a case of being equal to the threshold may be included in a determination result of being greater (or less) than the threshold, it should be understood by those of ordinary skill in the art that the case of being equal to the threshold may also be included in an opposite determination result, which is also within the scope of the present disclosure.

Unless otherwise defined, all terms (including technical and scientific terms) used herein have the same meaning as commonly understood by those of ordinary skill in the art. It should be further understood that terms, such as those defined in commonly used dictionaries, should be interpreted as having a meaning that is consistent with a meaning in the context of the related technology and the background of the present disclosure, and should not be interpreted in an idealized or overly formal sense unless expressly so defined herein.

Although a multi-user MIMO detection method according to the embodiments of the present disclosure is proposed based on a downlink multi-user MIMO scene of 5G NR, the multi-user MIMO detection method according to the embodiments of the present disclosure is not only applicable to the downlink multi-user MIMO scene of 5G NR, but is also applicable to any data transmission scene adopting the multi-user MIMO technology.

The multi-user MIMO detection method according to the embodiments of the present disclosure is mainly for detection of downlink data, because the problem that a modulation mode of a UE cannot be acquired does not exist in detection of uplink data.

FIG. 1 is a flowchart illustrating a multi-user MIMO detection method according to an embodiment of the present disclosure.

Referring to FIG. 1, an embodiment of the present disclosure provides a multi-user MIMO detection method applicable to a first UE, and the method includes the following operations 100 and 101.

In operation 100, in a case where it is determined that received data includes data for the first UE and data for at least one second UE, a first detection method is determined according to a modulation mode of the first UE.

In the embodiments of the present disclosure, the received data includes two or more layers of data, each layer of data corresponds to one data stream, and one data stream may be transmitted through at least one antenna. Each UE may occupy at least one of the two or more layers of data.

In the embodiments of the present disclosure, data for one UE refers to data having the UE as a preset reception target, or data which is useful for the UE. In addition, a second UE refers to a UE other than the first UE, and the number of second UEs may be one or more.

In the embodiments of the present disclosure, any one of the following two methods may be used to determine whether the received data includes the data for the first UE and the data for the at least one second UE or merely includes the data for the first UE.

The first method is to determine a size relation between a first target ratio and a first preset threshold, and to determine, if it is determined that the first target ratio is less than or equal to the first preset threshold, that the received data includes the data for the first UE and the data for the at least one second UE, or determining, if it is determined that the first target ratio is greater than the first preset threshold, that the received data merely includes the data for the first UE.

In the first method, the first target ratio is a ratio of Reference Signal Received Power (RSRP) of the first UE to the sum of RSRP of the at least one second UE, that is, $$\frac{P_1}{\sum_i P_{2i}};$$

where $P_1$ is the RSRP of the first UE, and $P_{2i}$ is RSRP of an $i^{th}$ second UE. It should be understood that, when the number of the at least one second UE is 1, the sum of the RSRP of the at least one second UE refers to a value of the RSRP of the one second UE.

The second method is to determine a size relation between a second target ratio and a third preset threshold, and to determine, if it is determined that the second target ratio is greater than or equal to the third preset threshold, that the received data includes the data for the first UE and the data for the at least one second UE, or determining, if it is determined that the second target ratio is less than the third preset threshold, that the received data merely includes the data for the first UE.

In the second method, the second target ratio is a ratio of the sum of the RSRP of the at least one second UE to the RSRP of the first UE, that is, $$\frac{\sum_i P_{2i}}{P_1}.$$

In addition, in the embodiments of the present disclosure, merely including the data for the first UE may indicate that the data of other UEs in the received data is taken as interference and noise.

Methods for determining the first preset threshold and the third preset threshold are described below.

The methods for determining the first and third preset thresholds are different in a case where a channel correlation can be detected and in a case where the channel correlation cannot be detected.

(I) Method for Determining First Preset Threshold

In some exemplary embodiments, before determining whether the first target ratio is less than or equal to the first preset threshold, the multi-user MIMO detection method further includes: detecting a channel correlation in a case where the channel correlation can be detected; and determining the first preset threshold according to the detected channel correlation.

In some exemplary embodiments, the case where the channel correlation can be detected refers to that the channel correlation can be accurately detected, or that the channel correlation can be detected but accuracy of the channel correlation is not considered.

In some exemplary embodiments, the channel correlation may be detected with detection methods well known to those of ordinary skill in the art. For example, an autocorrelation matrix $H^H$ of a channel matrix H is averaged within a certain time-frequency range to obtain a matrix C, and the channel correlation is determined according to a ratio of the sum of squares of modules of non-main diagonal elements of C to the sum of squares of modules of main diagonal elements of C. But in actual situations, a channel may undergo time-frequency changes, so that the ratio can result in relatively accurate detection of the channel correlation when the changes of the channel are slow, but cannot ensure accurate detection of the channel correlation when the changes of the channel are severe.

In some exemplary embodiments, determining the first preset threshold according to the detected channel correlation includes: according to a preset first corresponding relationship between channel correlations and first preset thresholds, determining the first preset threshold corresponding to the detected channel correlation. For example, in a case where the detected channel correlation can be found in the first corresponding relationship, the first preset threshold corresponding to the detected channel correlation is directly searched for; while in a case where the detected channel correlation cannot be found in the first corresponding relationship, an interpolation calculation is performed on the first corresponding relationship to obtain the first preset threshold corresponding to the detected channel correlation.

In some exemplary embodiments, the channel correlation refers to a correlation between channel estimations of two or more channels, and may be obtained by a calculation using a correlation calculation formula according to the channel estimations of the two or more channels.

In some exemplary embodiments, categories of the channel correlations in the first corresponding relationship may be set in advance according to actual needs, and a specific classification method is not limited in the embodiments of the present disclosure. For example, the channel correlations may be divided into a high channel correlation and a low channel correlation, the high channel correlation refers to that the channel correlation is greater than or equal to a fifth preset threshold, and the low channel correlation refers to that the channel correlation is less than the fifth preset threshold. As another example, the channel correlations may be divided into intervals according to value ranges, and each interval is regarded as being corresponding to a same first preset threshold.

In some exemplary embodiments, the first preset thresholds corresponding to the channel correlations in the first corresponding relationship may be obtained through simulation, that is, under the condition that the channel correlations and the detection methods are set, a detected performance parameter in the received data is simulated to obtain variation curves of the detected performance parameter along with the first target ratio which are corresponding to the detection methods; the corresponding variation curves may be respectively obtained for the different detection methods, and the first target ratio corresponding to an intersection point of the variation curves corresponding to all the detection methods corresponding to a same channel correlation is taken as the first preset threshold corresponding to such channel correlation. For example, the first detection method corresponds to one variation curve, the second detection method corresponds to one variation curve, and the first target ratio corresponding to an intersection point of the variation curve corresponding to the first detection method and the variation curve corresponding to the second detection method is taken as the first preset threshold corresponding to the channel correlation. Thus, under the condition that the second detection method is fixed, the first preset thresholds corresponding to different first detection methods are different. Under the condition that the first detection method is fixed, the first preset thresholds corresponding to different second detection methods are also different.

That is, an absolute value of a difference between the detected performance parameters obtained with the different detection methods corresponding to the first preset threshold is less than or equal to a sixth preset threshold.

In some exemplary embodiments, the detected performance parameter may be throughput or a bit error rate.

For example, FIG. 2 is a schematic diagram of variation curves of a detected performance parameter along with a first target ratio which are corresponding to different detection methods corresponding to different channel correlations according to an embodiment of the present disclosure. As shown in FIG. 2, communications parameters of a receiver of a UE are set according to the parameters shown in Table 1, and then different detection methods are respectively adopted to detect received data to obtain corresponding detected performance parameters. Transmitting power of data is changed to change RSRP of the data, which further changes the first target ratio. Then received data is detected again to obtain detected performance parameters corresponding to a series of first target ratios, and a variation curve is drawn based on the detected performance parameters corresponding to the series of first target ratios.

With the channel correlation unchanged, a different detection method is adopted to perform detection again to obtain the variation curves corresponding to the different detection methods, as shown in FIG. 2, variation curves corresponding to two detection methods under the high channel correlation and variation curves corresponding to two detection methods under the low channel correlation are respectively obtained. As can be seen from FIG. 2, the variation curves corresponding to the two detection methods under the high channel correlation intersect at a point (a point 1 in FIG. 2), and the first target ratio (10 decibels (dB) as shown in FIG. 2) corresponding to the intersection point 1 is taken as the first preset threshold corresponding to the high channel correlation; and the variation curves corresponding to the two detection methods under the low channel correlation also intersect at a point (a point 2 in FIG. 2), and the first target ratio (5 dB as shown in in FIG. 2) corresponding to the intersection point 2 is taken as the first preset threshold corresponding to the low channel correlation.

TABLE 1

| Parameter | Unit | Value |
|---|---|---|
| Uplink downlink configuration | | FR1-1(7D1F2U) |
| Sub-Carrier space | | 30 KHz |
| Cyclic prefix | | Normal |
| Cell ID | | 0 |
| Inter-TTI Distance | | 1 |
| Number of HARQ (Hybrid Automatic Repeat reQuest) processes | Processes | 8 |
| Maximum number of HARQ transmission | | 4 |
| Number of OFDM (Orthogonal Frequency Division Multiplexing) symbols for PDCCH (Physical Downlink Control Channel) | OFDM symbols | 2 |
| Demodulation reference symbols of PDSCH (Physical Downlink Shared Channel) | | Antenna port 0, 1, 2, 3 |
| Number of allocated resource blocks | Physical Resource Block (PRB) | 100 |
| Modulation | | QPSK (Quadrature Phase Shift Keying)\ 256-QAM (Quadrature Amplitude Modulation)\ 64-QAM\128-QAM |
| Propagation Condition | | FR-1 TDLA30 |
| Correlation Matrix and Antenna Configuration | | 4 × 4 layers, high channel correlation, low channel correlation |

In some exemplary embodiments, before determining whether the first target ratio is less than or equal to the first preset threshold, the multi-user MIMO method further includes:

in the case where the channel correlation cannot be detected, acquiring respective second preset thresholds corresponding to different channel correlations; and determining the first preset threshold according to the respective second preset thresholds corresponding to the different channel correlations.

In some example embodiments, the case where the channel correlation cannot be detected refers to that the channel correlation cannot be accurately detected or the channel correlation cannot be detected.

In some exemplary embodiments, the respective second preset thresholds corresponding to the different channel correlations may be obtained through simulation, that is, under the condition that the channel correlations and the detection methods are set, a detected performance parameter in the received data is simulated to obtain variation curves of the detected performance parameter along with the first target ratio which are corresponding to the detection methods; the corresponding variation curves may be respectively obtained for the different detection methods, and the first target ratio corresponding to an intersection point of the variation curves corresponding to all the detection methods corresponding to a same channel correlation is taken as the second preset threshold corresponding to such channel correlation. For example, the first detection method corresponds to one variation curve, the second detection method corresponds to one variation curve, and the first target ratio corresponding to an intersection point of the variation curve corresponding to the first detection method and the variation curve corresponding to the second detection method is taken as the second preset threshold corresponding to the channel correlation. Thus, under the condition that the second detection method is fixed, the second preset thresholds corresponding to different first detection methods are different. Under the condition that the first detection method is fixed, the second preset thresholds corresponding to different second detection methods are also different.

That is, an absolute value of a difference between the detected performance parameters obtained with the different detection methods corresponding to the second preset threshold is less than or equal to the sixth preset threshold.

In some exemplary embodiments, determining the first preset threshold according to the respective second preset thresholds corresponding to the different channel correlations includes: determining an average value of the respective second preset thresholds corresponding to the different channel correlations as the first preset threshold.

For example, as shown in FIG. 2, assuming that, for a same first detection method and a same second detection method, the second preset threshold corresponding to the high channel correlation is 10 dB and the second preset threshold corresponding to the low channel correlation is 5 dB, then the first preset threshold may be set to 7.5 dB.

As another example, in a case where the first detection method is an MMSE detection method, the second detection method is a Sphere Decoding-Interference Rejection Combination (SD-IRC) detection method and the modulation mode of the first UE is 256-QAM, the second preset threshold corresponding to the high channel correlation is 33 dB as shown in Table 2, and the second preset threshold corresponding to the low channel correlation is 28 dB as shown in Table 3, then the first preset threshold may be set to 30.5 dB.

TABLE 2

| First target ratio | Detected performance parameter of MMSE detection method | Detected performance parameter of SD-IRC detection method |
|---|---|---|
| 30 | 85.698214 | 80.802369 |
| 31 | 87.660279 | 85.241301 |
| 32 | 89.304061 | 88.623511 |
| 33 | 90.42199 | 90.983683 |

TABLE 3

| First target ratio | Detected performance parameter of MMSE detection method | Detected performance parameter of SD-IRC detection method |
|---|---|---|
| 27 | 85.231746 | 84.788 |
| 28 | 87.547662 | 88.136222 |
| 29 | 89.217701 | 90.238392 |

(II) Method for Determining Third Preset Threshold

In some exemplary embodiments, before determining whether the second target ratio is greater than or equal to the third preset threshold, the multi-user MIMO detection method further includes: detecting a channel correlation in a case where the channel correlation can be detected; and determining the third preset threshold according to the detected channel correlation.

In some exemplary embodiments, determining the third preset threshold according to the detected channel correlation includes: according to a preset second corresponding relationship between channel correlations and third preset thresholds, determining the third preset threshold corresponding to the detected channel correlation.

In some exemplary embodiments, categories of the channel correlations in the second corresponding relationship may be set in advance according to actual needs, and a specific classification method is not limited in the embodiments of the present disclosure. For example, the channel correlations may be divided into a high channel correlation and a low channel correlation, the high channel correlation refers to that the channel correlation is greater than or equal to the fifth preset threshold, and the low channel correlation refers to that the channel correlation is less than the fifth preset threshold. As another example, the channel correlations may be divided into intervals according to value ranges, and each interval is regarded as being corresponding to a same first preset threshold.

In some exemplary embodiments, the third preset thresholds corresponding to the channel correlations in the second corresponding relationship may be obtained through simulation, that is, under the condition that the channel correlations and the detection methods are set, a detected performance parameter in the received data is simulated to obtain variation curves of the detected performance parameter along with the second target ratio which are corresponding to the detection methods; the corresponding variation curves may be respectively obtained for the different detection methods, and the second target ratio corresponding to an intersection point of the variation curves corresponding to all the detection methods corresponding to a same channel correlation is taken as the third preset threshold corresponding to such channel correlation. For example, the first detection method corresponds to one variation curve, the second detection method corresponds to one variation curve, and the second target ratio corresponding to an intersection point of the variation curve corresponding to the first detection method and the variation curve corresponding to the second detection method is taken as the third preset threshold corresponding to the channel correlation. Thus, under the condition that the second detection method is fixed, the third preset thresholds corresponding to different first detection methods are different. Under the condition that the first detection method is fixed, the third preset thresholds corresponding to different second detection methods are also different.

That is, an absolute value of a difference between the detected performance parameters obtained with the different detection methods corresponding to the third preset threshold is less than or equal to the sixth preset threshold.

In some exemplary embodiments, before determining whether the second target ratio is greater than or equal to the third preset threshold, the method further includes: in the case where the channel correlation cannot be detected, acquiring respective fifth preset thresholds corresponding to different channel correlations; and determining the third preset threshold according to the respective fifth preset thresholds corresponding to the different channel correlations.

In some exemplary embodiments, the respective fifth preset thresholds corresponding to the different channel correlations may be obtained through simulation, that is, under the condition that the channel correlations and the detection methods are set, a detected performance parameter in the received data is simulated to obtain variation curves of the detected performance parameter along with the second target ratio which are corresponding to the detection methods; the corresponding variation curves may be respectively obtained for the different detection methods, and the second target ratio corresponding to an intersection point of the variation curves corresponding to all the detection methods corresponding to a same channel correlation is taken as the fifth preset threshold corresponding to such channel correlation. For example, the first detection method corresponds to one variation curve, the second detection method corresponds to one variation curve, and the second target ratio corresponding to an intersection point of the variation curve corresponding to the first detection method and the variation curve corresponding to the second detection method is taken as the fifth preset threshold corresponding to the channel correlation. Thus, under the condition that the second detection method is fixed, the fifth preset thresholds corresponding to different first detection methods are different. Under the condition that the first detection method is fixed, the fifth preset thresholds corresponding to different second detection methods are also different.

That is, an absolute value of a difference between the detected performance parameters obtained with the different detection methods corresponding to the fifth preset threshold is less than or equal to the sixth preset threshold.

In some exemplary embodiments, determining the third preset threshold according to the respective fifth preset thresholds corresponding to the different channel correlations includes: determining an average value of the respective fifth preset thresholds corresponding to the different channel correlations as the third preset threshold.

In some exemplary embodiments, determining the first detection method according to the modulation mode of the first UE includes: determining a detection method with optimal detection performance as the first detection method according to the modulation mode of the first UE.

In some exemplary embodiments, determining the first detection method according to the modulation mode of the first UE includes: in a case where the modulation mode of the first UE is a low modulation mode, determining that the first detection method is a detection method of SD-low modulation mode; in a process of performing multi-user joint detection (which will be described in detail below) on the received data with the first detection method, a modulation mode of the second UE is set to be the same as that of the first UE; and the low modulation mode is a modulation mode with a modulation order less than or equal to a fourth preset threshold, for example, the low modulation mode may be QPSK or Binary Phase Shift Keying (BPSK).

That is, in the case where the modulation mode of the first UE is the low modulation mode, detection performance of the detection method of SD-low modulation mode is better than that of the MMSE detection method, that is, the detection method of SD-low modulation mode is the detection method with better detection performance.

In the embodiments of the present disclosure, the detection method of SD-low modulation mode essentially adopts an SD detection method to perform detection. Since the first UE cannot acquire the modulation mode of the second UE, the detection may be regarded as single-user detection after the modulation mode of the second UE is uniformly set to be the same as the low modulation mode of the first UE, that is, in essence, the detection is the single-user detection performed with the SD detection method.

A detection process of the SD detection method is briefly described below.

Assuming that a multi-user MIMO system includes $M_T$ transmit data streams and $M_R > M_T$ receiving antennas, and encoded bit streams are mapped to a constellation diagram and form $M_T$ transmit symbols $s \in o^{M_T}$, where O is a set of constellation points. Taking a case where $M_T = 4$, $M_R = 4$, and one second U is provided as an example, the data received by the first UE is expressed by formula (1).

$$Y = Hs + N_0 \qquad (1)$$

Where Y represents the received data, $$H = \begin{bmatrix} h_{00} & h_{01} & h_{02} & h_{03} \\ h_{10} & h_{11} & h_{12} & h_{13} \\ h_{20} & h_{21} & h_{22} & h_{23} \\ h_{30} & h_{31} & h_{32} & h_{33} \end{bmatrix}$$

represents a channel estimation matrix, $$s = \begin{bmatrix} s_0^0 \\ s_1^0 \\ s_0^1 \\ s_1^1 \end{bmatrix}$$

represents a transmit data stream, and $N_0$ represents noise.

QR decomposition is performed on the channel estimation matrix H in the formula (1), i.e., H=QR, and then the received data Y is preprocessed, i.e., formula (2).

$$Z = Q^H Y = Q^H QRs + Q^H N_0 = Rs + N_0' \qquad (2)$$

Assuming that a Likelihood Ratio (LLR) value output by the $k^{th}$ bit of the $i^{th}$ transmit symbol may be expressed as $LLR_{i,k}$, i.e., formula (3).

$$LLR_{i,k} = \begin{cases} \dfrac{D^{ML} - D^{MLC}}{N_0} & x_{i,k} = 0 \\ \dfrac{D^{MLC} - D^{ML}}{N_0} & x_{i,k} = 1 \end{cases} \qquad (3)$$

Where $X_{i,k}$ represents a value of the $k^{th}$ bit of the $i^{th}$ transmit symbol, $D^{ML} = \|Z - Rs^{ML}\|^2$ represents a Euclidean distance of an ML path, $s^{ML}$ represents a transmit symbol corresponding to the ML path, $D^{MLC} = \|Z - Rs^{MLC}\|^2$ represents a Euclidean distance of a Maximum Likelihood Classification (MLC) path of a complementary set of the ML path, $s^{MLC}$ represents a transmit symbol corresponding to the MLC path, and the complementary set represents a set of paths of all transmit symbols except for the path corresponding to $X_{i,k}$ in the constellation diagram.

The Maximum Likelihood detection can adopt the above two formulae to perform traversal search of the paths to achieve the optimal performance, but involves a large amount of computation. The SD detection simplifies a search process into a search process by tree nodes as shown in FIG. 3 and a selection process. Each parent node includes a plurality of child nodes in conformity with the number of constellation points, and the search is performed from the root node to the leaf nodes in sequence; and several pairs of node trees from each layer of nodes are reserved for selection, and finally an optimal path is selected from a plurality of reserved complete paths as the ML path. The transmit symbol of the first UE (i.e., UE0 in FIG. 3) shown in FIG. 3 is $$s_0^0,$$

the modulation mode of $$s_0^0$$

is QPSK, the modulation mode of the second UE (i.e., UE1 in FIG. 3) cannot be acquired by the first UE, and the modulation mode of the transmit symbol $$s_0^1$$

of the second UE is forcibly set to be QPSK during the search process, so that 4 transmit symbols in total participate in the search process.

Assuming that the number of the reserved nodes from each layer $n_s = (n_4, n_3, n_2, n_1)$ takes (4,1,1,1), where $n_i$ is the number of the reserved child nodes below the parent node, it can be seen from FIG. 3 that the number of the finally reserved complete paths is 4 (i.e., the paths denoted by the dashed lines in FIG. 3), and finally the optimal path (i.e., the second path denoted by the dashed lines on the left) of the 4 paths is selected as the ML path.

In some exemplary embodiments, determining the first detection method according to the modulation mode of the first UE includes: in a case where the modulation mode of the first UE is a high modulation mode, determining that the first detection method is the MMSE detection method; and the high modulation mode is a modulation mode with a modulation order greater than the fourth preset threshold, for example, the high modulation mode is 64-QAM, 128-QAM, or 256-QAM.

That is, in the case where the modulation mode of the first UE is the high modulation mode, detection performance of the MMSE detection method is better than that of the SD-low modulation mode, that is, the MMSE detection method is the detection method with better detection performance.

A detection process of the MMSE detection method is briefly described below.

The MMSE detection method is performing joint detection on the first UE and the second UE, i.e., formula (4).

$$\hat{s} = H^H (H^H H + N_0)^{-1} Y \qquad (4)$$

Estimations of $$s_0^1 \text{ and } s_1^1$$

are obtained from first 2 paths of $\hat{s}$, and then demodulation is performed to obtain an LLR value.

In operation 101, multi-user joint detection is performed on the received data with the first detection method.

In some exemplary embodiments, in a case where it is determined that the received data merely includes the data for the first UE, the method further includes: performing single-user detection on the data for the first UE in the received data with a second detection method.

In the embodiments of the present disclosure, the multi-user joint detection refers to performing detection with all the received data taken as the data transmitted to a UE, and the single-user detection refers to performing detection with merely the data for the first UE taken as the data transmitted to a UE and with the other data taken as interference signals.

In some exemplary embodiments, the second detection method may be an SD-IRC detection method.

A detection process of the SD-IRC detection method is briefly described below.

The SD-IRC detection method refers to that the first UE and the second UE are not jointly subjected to the SD detection and merely the single-user detection of the first UE is performed, and the second UE is taken as a combination of interference and noise to be subjected to IRC before the SD detection is performed.

Assuming that a multi-user MIMO system includes $M_T$ transmit data streams and $M_R > M_T$ receiving antennas, encoded bit and streams are mapped to a constellation diagram and form $M_T$ transmit symbols $s \in o^{M_T}$, where O is a set of constellation points. Taking the case where $M_T = 4$, $M_R = 4$, and one second U is provided as an example, the data received by the first UE is expressed by formula (5).

$$Y = H_1 s_1 + H_2 s_2 + N_0 \tag{5}$$

Where Y represents the data received by the first UE, $N_0$ represents noise, $$H_1 = \begin{bmatrix} h_{00} & h_{01} \\ h_{10} & h_{11} \\ h_{20} & h_{21} \\ h_{30} & h_{31} \end{bmatrix}$$

represents a channel estimation matrix corresponding to the first UE, $$H_2 = \begin{bmatrix} h_{02} & h_{03} \\ h_{12} & h_{13} \\ h_{22} & h_{23} \\ h_{32} & h_{33} \end{bmatrix}$$

represents a channel estimation matrix corresponding to the second UE, $$s_1 = \begin{bmatrix} s_0^0 \\ s_1^0 \end{bmatrix}$$

represents a transmit symbol corresponding to the first UE, and $$s_2 = \begin{bmatrix} s_0^1 \\ s_1^1 \end{bmatrix}$$

represents a transmit symbol corresponding to the second UE.

A covariance matrix of interference and noise of the first UE is calculated by formula (6).

$$\tilde{R} = E[(H_2 s_2 + N_0)(H_2 s_2 + N_0)^*] \tag{6}$$

where $\tilde{R}$ represents a covariance matrix.

Cholesky decomposition is performed on the covariance matrix to obtain formula (7).

$$\tilde{R} = V^H V \tag{7}$$

where V represents an upper triangular matrix of the covariance matrix.

Inverse operation is performed on the upper triangular matrix V to obtain formula (8), whitening processing according to formula (9) and formula (10) are then performed, a result of the whitening processing is input to the SD detection method to perform SD detection on 2 paths of data to obtain LLR values of the 2 paths of data.

$$U = (V)^{-H} \tag{8}$$

$$\hat{H} = U H_1 \tag{9}$$

$$\hat{Y} = U Y \tag{10}$$

In the embodiments of the present disclosure, as shown in FIG. 2, assuming that the first detection method in FIG. 2 is the detection method of SD-low modulation mode and the second detection method is the SD-IRC detection method, it can be seen from FIG. 2 that, under the high channel correlation, when the first target ratio is less than or equal to the first preset threshold, the variation curve corresponding to the first detection method is above the variation curve corresponding to the second detection method, that is, the detected performance parameter corresponding to the first detection method is larger than that corresponding to the second detection method, with the result that the first detection method has better detection performance, that is, the SD-low modulation mode detection method has better detection performance; and when the first target ratio is greater than the first preset threshold, the variation curve corresponding to the second detection method is above the variation curve corresponding to the first detection method, that is, the detected performance parameter corresponding to the second detection method is larger than that corresponding to the first detection method, with the result that the second detection method has better detection performance, that is, the SD-IRC detection method has better detection performance. Under the low channel correlation, when the first target ratio is less than or equal to the first preset threshold, the variation curve corresponding to the first detection method is above the variation curve corresponding to the second detection method, that is, the detected performance parameter corresponding to the first detection method is larger than that corresponding to the second detection method, with the result that the first detection method has better detection performance, that is, the SD-low modulation mode detection method has better detection performance; and when the first target ratio is greater than the first preset threshold, the variation curve corresponding to the second detection method is above the variation curve corresponding to the first detection method, that is, the detected performance parameter corresponding to the second detection method is larger than that corresponding to the first detection method, with the result that the second detection method has better detection performance, that is, the SD-IRC detection method has better detection performance.

According to the multi-user MIMO detection method provided by the embodiments of the present disclosure, in the case where the received data includes the data for the first UE and the data for the at least one second UE, the first detection method is determined according to the modulation mode of the first UE, and the multi-user joint detection is performed on the received data with the first detection method. During the whole detection process, the modulation mode of the second UE is not needed, and the processing flow of the transmitting terminal does not need to be changed, thereby achieving detection of the received data in a simple way.

Another embodiment of the present disclosure provides an electronic device, including: at least one processor; and a memory having stored thereon at least one program which, when executed by the at least one processor, implements the multi-user MIMO detection method according to any one of the above embodiments.

The processor is a device having data processing capability, and includes, but is not limited to, a Central Processing Unit (CPU); and the memory is a device having data storage capability, and includes, but is not limited to, a Random Access Memory (RAM, more specifically, a Synchronous Dynamic RAM (SDRAM), a Double Data Rate SDRAM (DDR SDRAM), etc.), a Read-Only Memory (ROM), an Electrically Erasable Programmable Read-Only Memory (EEPROM), and a flash memory (FLASH).

In some embodiments, the processor and the memory are connected to each other through a bus, and then are connected to other components of a computing device.

Yet another embodiment of the present disclosure provides a computer-readable storage medium having stored thereon a computer program which, when executed by a processor, implements the multi-user MIMO detection method according to any one of the above embodiments.

Figure 4:
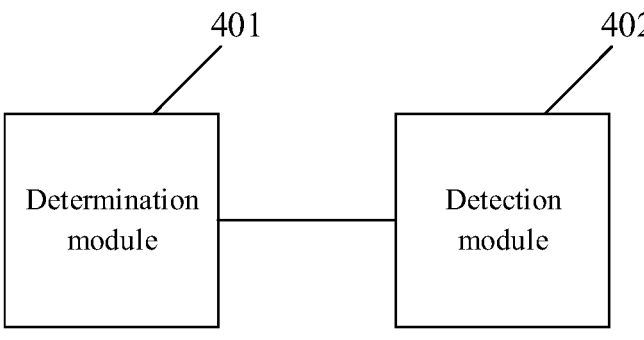
FIG. 4 is a block diagram of a multi-user MIMO detection apparatus according to another embodiment of the present disclosure.

FIG. 4 is a block diagram of a multiuser MIMO detection apparatus according to the embodiment.

Referring to FIG. 4, the embodiment provides a multi-user MIMO detection apparatus, which may be disposed in a first UE, and includes: a determination module 401 configured to determine, in a case where it is determined that received data includes data for the first UE and data for at least one second UE, a first detection method according to a modulation mode of the first UE; and a detection module 402 configured to perform multi-user joint detection on the received data with the first detection method.

In some exemplary embodiments, the detection module 402 is further configured to: in a case where it is determined that the received data merely includes the data for the first UE, perform single-user detection on the data for the first UE in the received data with a second detection method.

In some exemplary embodiments, the determination module 401 is configured to achieve determining that the received data includes the data for the first UE and the data for the at least one second UE with the following method: determining that a first target ratio is less than or equal to a first preset threshold. The first target ratio is a ratio of RSRP of the first UE to the sum of RSRP of the at least one second UE.

In some exemplary embodiments, the determination module 401 is further configured to: detect a channel correlation in a case where the channel correlation can be detected; and determine the first preset threshold according to the detected channel correlation.

In some exemplary embodiments, the determination module 401 is further configured to achieve determining the first preset threshold according to the detected channel correlation with the following method: according to a preset first corresponding relationship between channel correlations and first preset thresholds, determining the first preset threshold corresponding to the detected channel correlation.

In some exemplary embodiments, the determination module 401 is further configured to: in a case where the channel correlation cannot be detected, acquire respective second preset thresholds corresponding to different channel correlations, and determine the first preset threshold according to the respective second preset thresholds corresponding to the different channel correlations.

In some exemplary embodiments, the determination module 401 is further configured to achieve determining the first preset threshold according to the respective second preset thresholds corresponding to the different channel correlations with the following method: determining an average value of the respective second preset thresholds corresponding to the different channel correlations as the first preset threshold.

In some exemplary embodiments, the determination module 401 is further configured to achieve determining that the received data includes the data for the first UE and the data for the at least one second UE with the following method: determining that a second target ratio is greater than or equal to a third preset threshold. The second target ratio is a ratio of the sum of the RSRP of the at least one second UE to the RSRP of the first UE.

In some exemplary embodiments, the determination module 401 is further configured to achieve determining the first detection method according to the modulation mode of the first UE with the following method: in a case where the modulation mode of the first UE is a low modulation mode, determining that the first detection method is a detection method of SD-low modulation mode; in a process of performing the multi-user joint detection on the received data with the first detection method, a modulation mode of the second UE is set to be the same as that of the first UE; and the low modulation mode is a modulation mode with a modulation order less than or equal to a fourth preset threshold.

In some exemplary embodiments, the determination module 401 is further configured to achieve determining the first detection method according to the modulation mode of the first UE with the following method: in a case where the modulation mode of the first UE is a high modulation mode, determining that the first detection method is an MMSE detection method; and the high modulation mode is a modulation mode with a modulation order greater than the fourth preset threshold.

A specific implementation process of the multi-user MIMO detection apparatus according to the embodiments of the present disclosure is the same as that of the multi-user MIMO detection method according to the aforesaid embodiments, and thus will not be repeated here.

It should be understood by those of ordinary skill in the art that the functional modules/units in all or some of the operations, systems and devices in the method disclosed above may be implemented as software, firmware, hardware, or suitable combinations thereof. If implemented as hardware, the division between the functional modules/units stated above is not necessarily corresponding to the division of physical components; for example, one physical component may have a plurality of functions, or one function or operation may be performed through cooperation of several physical components. Some or all of the physical components may be implemented as software executed by a processor, such as a central processing unit, a digital signal processor or a microprocessor, or may be implemented as hardware, or may be implemented as an integrated circuit, such as an application specific integrated circuit. Such software may be distributed on a computer-readable medium, which may include a computer storage medium (or a non-transitory medium) and a communication medium (or a transitory medium). As well known by those of ordinary skill in the art, the term "computer storage medium" includes volatile/nonvolatile and removable/non-removable media used in any method or technology for storing information (such as computer-readable instructions, data structures, program modules and other data). The computer storage medium includes, but is not limited to, an RAM, an ROM, an EEPROM, a flash memory or other memory techniques, a Compact Disc Read Only Memory (CD-ROM), a Digital Versatile Disc (DVD) or other optical discs, a magnetic cassette, a magnetic tape, a magnetic disk or other magnetic storage devices, or any other medium which can be configured to store desired information and can be accessed by a computer. In addition, it is well known by those of ordinary skill in the art that the communication media generally include computer-readable instructions, data structures, program modules, or other data in modulated data signals such as carrier wave or other transmission mechanism, and may include any information delivery medium.

The present disclosure discloses the exemplary embodiments using specific terms, but the terms are merely used and should be merely interpreted as having general illustrative meanings, rather than for the purpose of limitation. Unless expressly stated, it is apparent to those of ordinary skill in the art that features, characteristics and/or elements described in connection with a particular embodiment can be used alone or in combination with features, characteristics and/or elements described in connection with other embodiments. Therefore, it should be understood by those of ordinary skill in the art that various changes in the forms and the details can be made without departing from the scope of the present disclosure of the appended claims.

What is claimed is:

1. A multi-user multiple-input multiple-output detection method applicable to first user equipment, comprising:

in a case where it is determined that received data includes data for the first user equipment and data for at least one second user equipment, determining a first detection method according to a modulation mode of the first user equipment; and performing multi-user joint detection on the received data with the first detection method, wherein determining the first detection method according to the modulation mode of the first user equipment comprises:

in a case where the modulation mode of the first user equipment is a low modulation mode, determining that the first detection method is a detection method of Sphere Decoding-low modulation mode, wherein in a process of performing the multi-user joint detection on the received data with the first detection method, the modulation mode of the at least one second user equipment is set to be the same as the modulation mode of the first user equipment; and in a case where the modulation mode of the first user equipment is a high modulation mode, determining that the first detection method is a Minimum Mean Square Error detection method.

2. The multi-user multiple-input multiple-output detection method of claim 1, further comprising:

in a case where it is determined that the received data merely includes the data for the first user equipment, performing single-user detection on the data for the first user equipment in the received data with a second detection method.

3. The multi-user multiple-input multiple-output detection method of claim 1, wherein the received data including the data for the first user equipment and the data for the at least one second user equipment is determined by: determining that a first target ratio is less than or equal to a first preset threshold; wherein the first target ratio is a ratio of Reference Signal Received Power of the first user equipment to a sum of Reference Signal Received Power of the at least one second user equipment.

4. The multiple-user multiple-input multiple-output detection method of claim 3, before determining whether the first target ratio is less than or equal to the first preset threshold, further comprising:

detecting a channel correlation in a case where the channel correlation is allowed to be detected; and determining the first preset threshold according to the detected channel correlation.

5. The multiple-user multiple-input multiple-output detection method of claim 4, wherein determining the first preset threshold according to the detected channel correlation comprises:

according to a preset first corresponding relationship between channel correlations and first preset thresholds, determining the first preset threshold corresponding to the detected channel correlation.

6. The multiple-user multiple-input multiple-output detection method of claim 3, before determining whether the first target ratio is less than or equal to the first preset threshold, further comprising:

in a case where a channel correlation is not allowed to be detected, acquiring respective second preset thresholds corresponding to different channel correlations; and determining the first preset threshold according to the respective second preset thresholds corresponding to the different channel correlations.

7. The multi-user multiple-input multiple-output detection method of claim 6, wherein determining the first preset threshold according to the respective second preset thresholds corresponding to the different channel correlations comprises:

determining an average value of the respective second preset thresholds corresponding to the different channel correlations as the first preset threshold.

8. The multi-user multiple-input multiple-output detection method of claim 1, wherein the received data including the data for the first user equipment and the data for the at least one second user equipment is determined by: determining that a second target ratio is greater than or equal to a third preset threshold; wherein the second target ratio is a ratio of a sum of Reference Signal Received Power of the at least one second user equipment to Reference Signal Received Power of the first user equipment.

9. The multiple-user multiple-input multiple-output detection method of claim 1, wherein the low modulation mode is a modulation mode with a modulation order less than or equal to a fourth preset threshold.

10. The multiple-user multiple-input multiple-output detection method claim 1, wherein the high modulation mode is a modulation mode with a modulation order greater than a fourth preset threshold.

11. An electronic device, comprising:

at least one processor; and a memory having stored thereon at least one program which, when executed by the at least one processor, implements the multi-user multiple-input multiple-output detection method of claim 1.

12. A non-transitory computer-readable storage medium having stored thereon a computer program which, when executed by a processor, implements the multi-user multiple-input multiple-output detection method of claim 1.

13. A multiple-user multiple-input multiple-output detection apparatus, comprising:

a selector configured to determine, in a case where it is determined that received data comprises data for first user equipment and data for at least one second user equipment, a first detection method according to a modulation mode of the first user equipment; and a detector configured to perform multi-user joint detection on the received data with the first detection method, wherein the selector is further configured to: in a case where the modulation mode of the first user equipment is a low modulation mode and the first user equipment cannot acquire modulation mode of the at least one second user equipment, determine that the first detection method is a detection method of Sphere Decoding-low modulation mode, wherein in a process of performing the multi-user joint detection on the received data with the first detection method, the modulation mode of the at least one second user equipment is set to be the same as the modulation mode of the first user equipment; and in a case where the modulation mode of the first user equipment is a high modulation mode, determine that the first detection method is a Minimum Mean Square Error detection method.

\* \* \* \* \*